(12) United States Patent
Pellenc et al.

(10) Patent No.: US 9,187,120 B2
(45) Date of Patent: Nov. 17, 2015

(54) HYDRAULIC STEERING OF VEHICLES AND SELF-PROPELLED MACHINES

(71) Applicants: Roger Pellenc, Pertuis (FR); Jean-Marc Gialis, Cheval Blanc (FR)

(72) Inventors: Roger Pellenc, Pertuis (FR); Jean-Marc Gialis, Cheval Blanc (FR)

(73) Assignee: PELLENC (SOCIETE ANONYME), Pertuis (FR)

( * ) Notice: Subject to any disclaimer, the term of this patent is extended or adjusted under 35 U.S.C. 154(b) by 0 days.

(21) Appl. No.: 13/952,034

(22) Filed: Jul. 26, 2013

(65) Prior Publication Data

US 2014/0048348 A1 Feb. 20, 2014

(30) Foreign Application Priority Data

Aug. 14, 2012 (FR) ...................................... 12 57796

(51) Int. Cl.
*B62D 5/22* (2006.01)
*B62D 3/14* (2006.01)
*B62D 7/08* (2006.01)
*B62D 7/09* (2006.01)

(52) U.S. Cl.
CPC .. *B62D 5/22* (2013.01); *B62D 3/14* (2013.01); *B62D 7/08* (2013.01); *B62D 7/09* (2013.01)

(58) Field of Classification Search
CPC .............. B62D 5/22; B62D 3/12; B62D 5/12; B62D 3/14; B62D 7/08; B62D 7/09
USPC .......................................... 180/428, 6.3, 6.24
See application file for complete search history.

(56) References Cited

U.S. PATENT DOCUMENTS

| 2,757,014 | A | | 7/1956 | Schmitz |
| 3,014,548 | A | * | 12/1961 | Donner et al. ................ 180/420 |
| 4,003,447 | A | | 1/1977 | Weyer |
| 5,335,739 | A | * | 8/1994 | Pieterse et al. ................ 180/6.3 |
| 7,690,685 | B2 | * | 4/2010 | Sasaoka ......................... 280/771 |
| 8,136,613 | B2 | * | 3/2012 | Schaedler et al. ........... 180/6.24 |
| 2007/0144796 | A1 | * | 6/2007 | Schaedler et al. ........... 180/6.24 |

FOREIGN PATENT DOCUMENTS

| EP | 0300185 A2 | 1/1989 |
| FR | 1201675 A | 1/1960 |
| FR | 2694535 A1 | 2/1994 |
| GB | 1222719 A | 2/1971 |
| WO | 0125071 A2 | 4/2001 |

* cited by examiner

*Primary Examiner* — Tony Winner
(74) *Attorney, Agent, or Firm* — Egbert Law Offices, PLLC

(57) ABSTRACT

Hydraulic steering for automobiles and self-propelled machines features at least two steering wheels and has a steering wheel linked to a hydraulic distributor, characterized in that it has at least two hydraulic modules. Each module includes a module body including an assembly having a double piston integral in translation with a rack. The piston is housed with a sliding aptitude in a cylinder body in which it delimits two opposite chambers. Each module also includes a gear meshing with the rack. Each of these modules is linked, on the one hand, through the intermediary of its pivoting element to one of the steering wheels and, on the other hand, through the intermediary of its fixed organ, to the vehicle chassis, and in that said distributor is connected to one of the chambers delimited by the rack piston of each module, the second of the chambers communicating with each other.

8 Claims, 15 Drawing Sheets

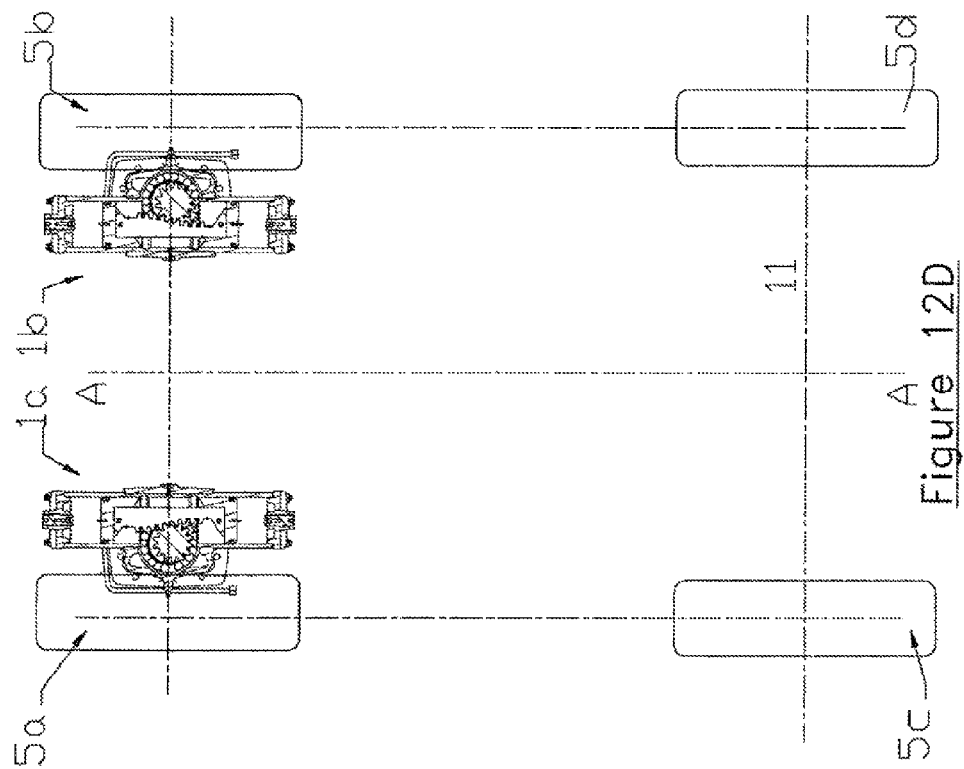
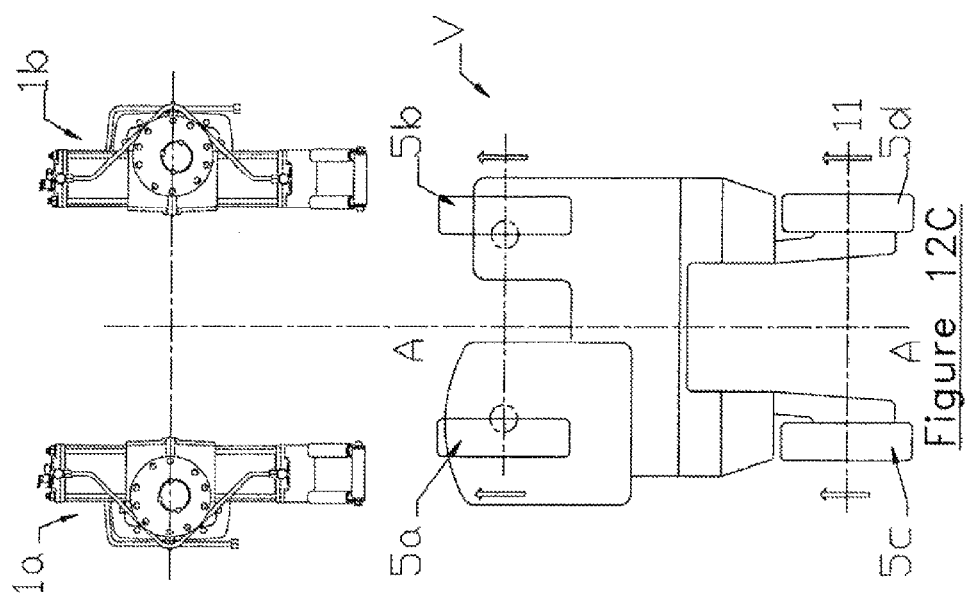

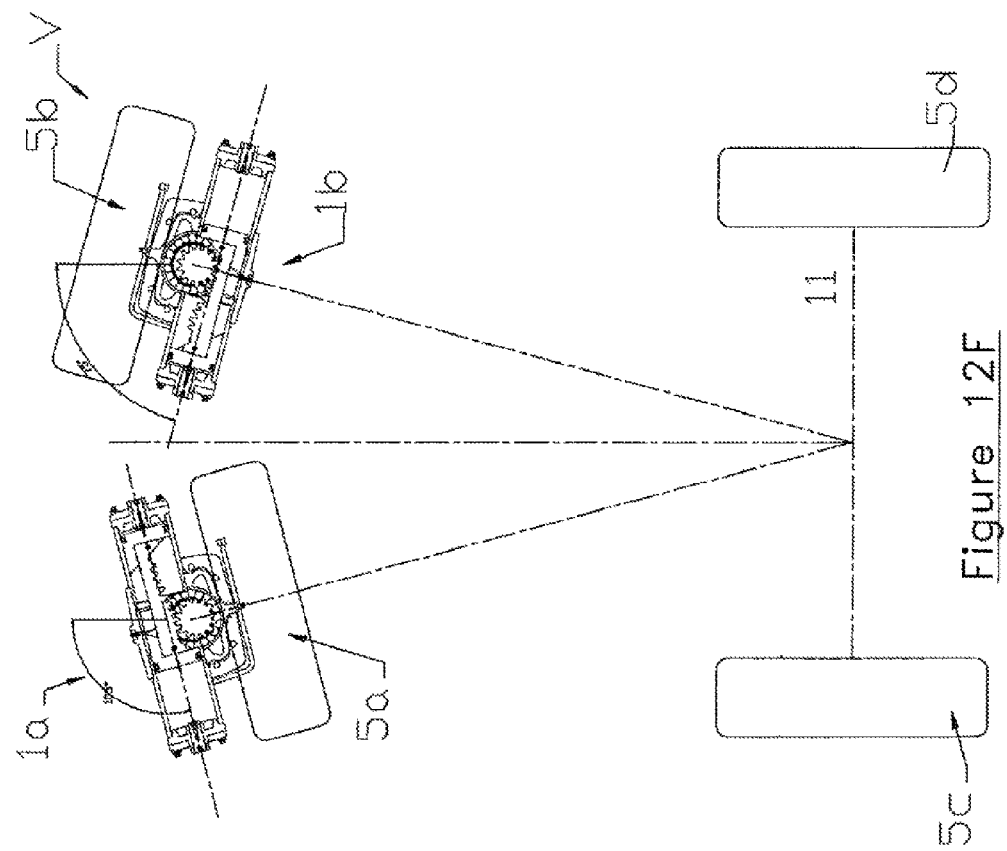
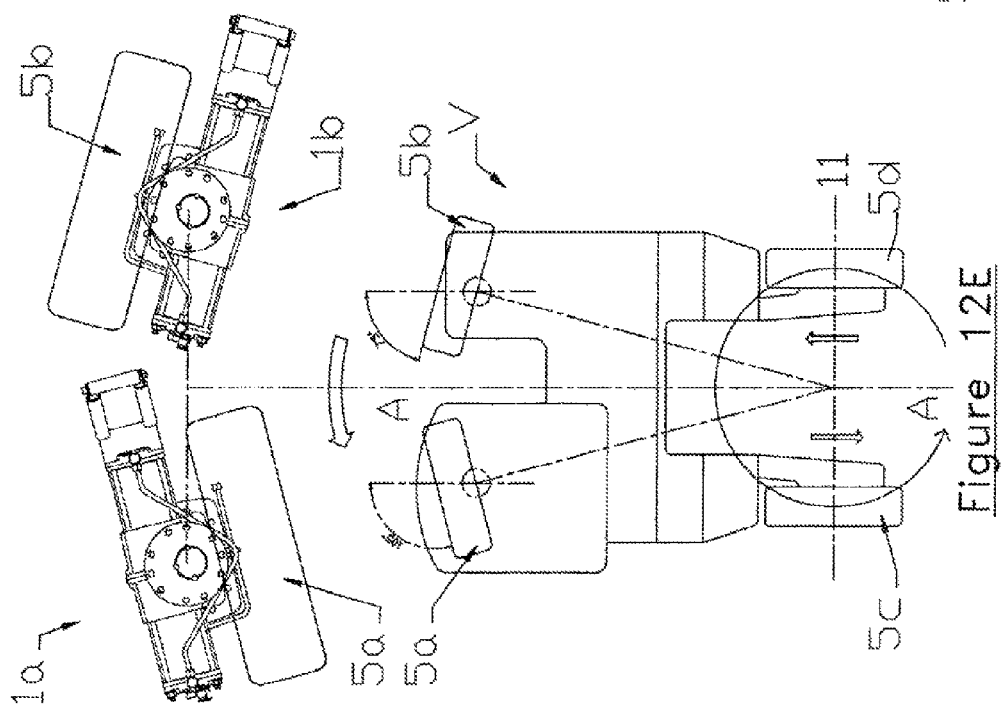

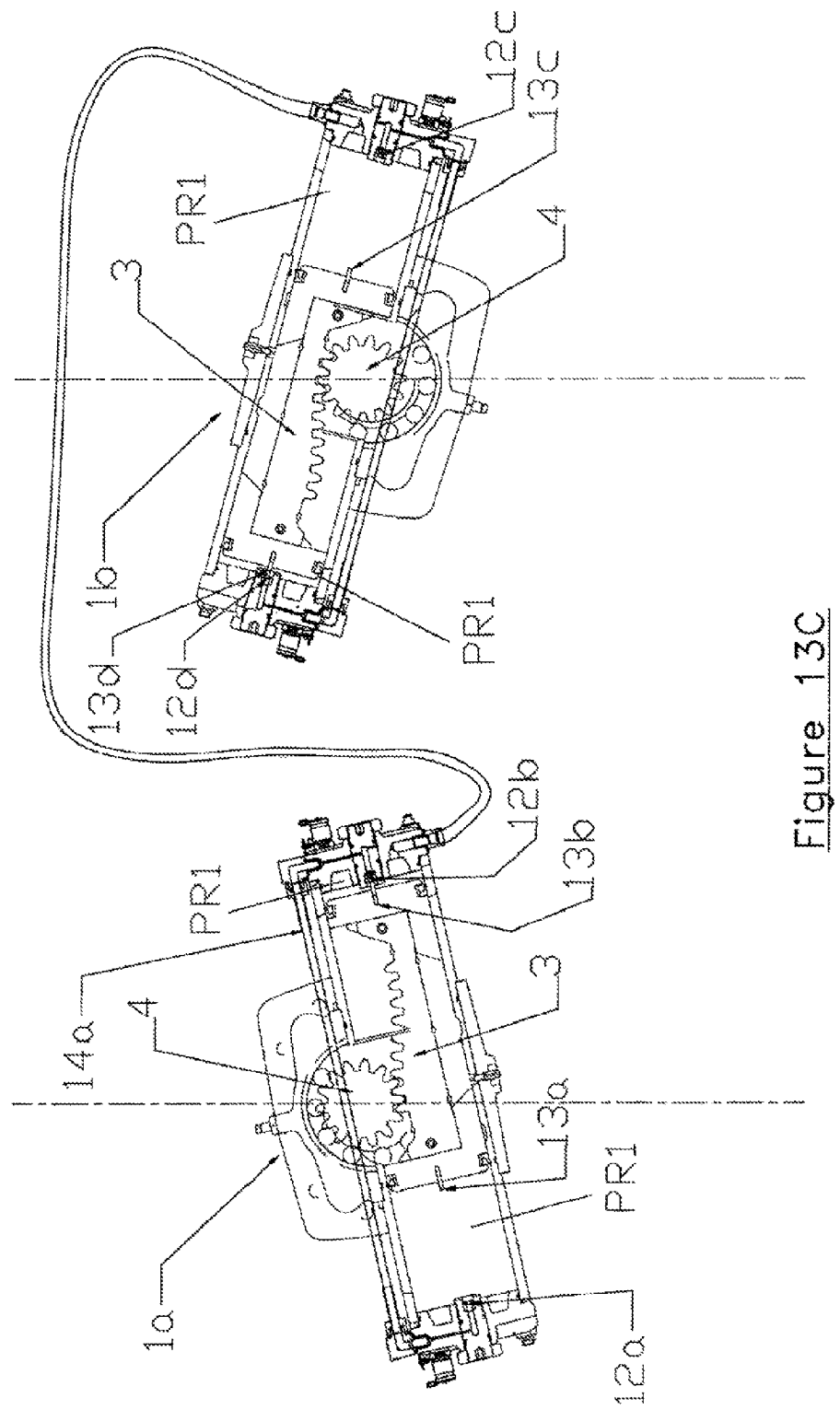

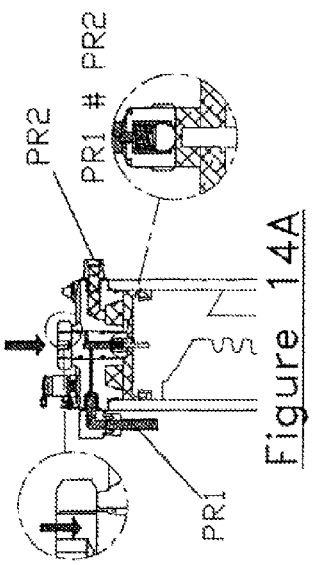
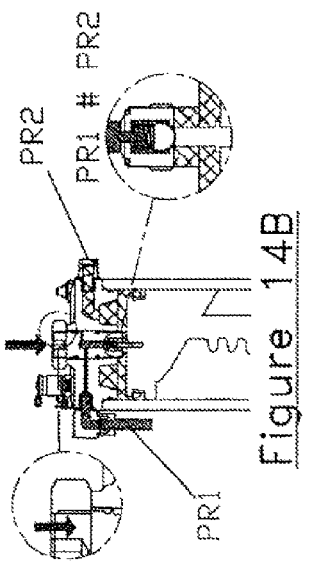
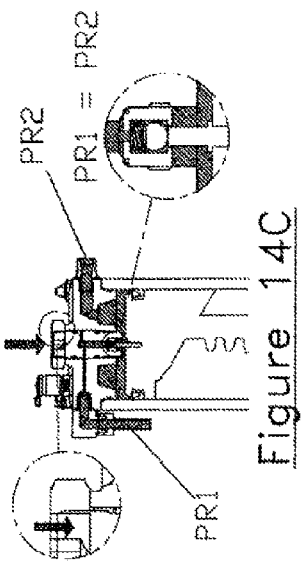
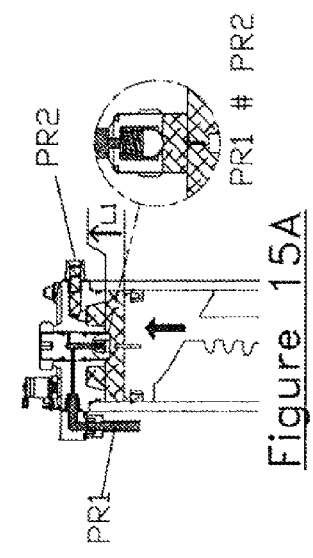
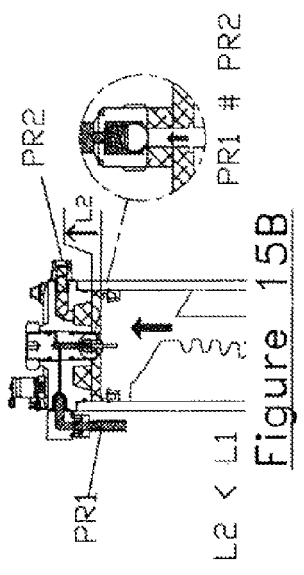
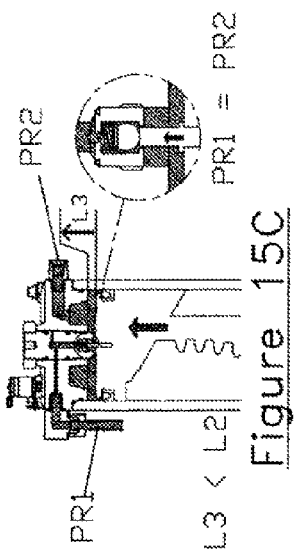

HYDRAULIC STEERING OF VEHICLES AND SELF-PROPELLED MACHINES

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns hydraulic steering of vehicles making use of hydraulic modules generating a rotary movement of variable amplitude derived from a constant hydraulic output.

The invention falls into the domain of self-propelled vehicles featuring at least two steerable wheels. More specifically, it concerns the field of self-propelled machines with two steerable wheels, allowing, for example, turning radii according to Jeantaud's diagram. It is especially applicable to: the equipment of grape harvesters; and vehicles or self-propelled machines with at least two steerable wheels, for which the users would like to have available machines capable of achieving the smallest turning radius possible.

2. Description of Related Art Including Information Disclosed Under 37 CFR 1.97 and 37 CFR 1.98

Self-propelled machines with at least two steerable wheels are equipped with steering mechanisms which make it possible to steer them while they are in motion. These steering mechanisms act directly on each steerable wheel to obtain the turning radius of the machine.

In order to achieve this turning radius in an efficient manner and to avoid the phenomenon of "wheel slipping" (the wheels sliding instead of rolling, thereby degrading the soil as well as the tires), it is necessary, during the turn, that the rotating axes of each of the wheels of the machine, regardless of whether they are steerable or not, be concurrent in a single point which is the instantaneous center of rotation (ICR) of the machine in projection to the ground: this is the application of the principle in the Jeantaud diagram.

Various methods exist to obtain this diagram (mechanical, electric, hydraulic, even combined steering mechanisms), the most common one actuating steering tie-rods and jacks which make it possible, according to a geometry adapted and known by the experts, to approximate this diagram.

The major setbacks of this steering system are: the space requirement; a wide turning radius of the vehicle, because the maximum turning angle is limited b the technology of this tie-rod and jack system; and a very significant loss of torque at the steering lock due to the kinematics of this type of steering.

For a self-propelled machine of the type used, for example, in agriculture and in particular for a straddling vehicle (grape harvester, trimming machine, etc.), it is very important to increase the maneuverability of the machine, especially on short headlands, and to limit the number of maneuvers in steering operations. That is why one seeks to limit the turning radius of the machine to the smallest value possible.

But obtaining this small turning radius is not possible with the mechanical technologies existing today while respecting the Jeantaud diagram, from the straight line to the maximum turn, especially with machines equipped with connecting rod and cylinder steering systems or even with conventional rack cylinders.

Furthermore, in the case of a straddling machine, the travel lane of the vehicle is related to the distance between two plant rows, which varies depending on the region and the type of plants cultivated. If one plans to build a variable track vehicle, it is difficult to be satisfied with a mechanical steering system based on connecting rod assemblies and cylinders.

The builders of such vehicles are therefore intent on:
- doing away with the mechanical linkages of the steering wheels;
- being independent of the variability of the vehicle's driving lane;
- being mindful of the Jeantaud diagram at any point during the turn; and
- having at their disposal a system which allows them to reduce the turning radius to its possible minimum when this is necessary.

Various solutions for steering systems exist today:

Steering system by mechanical rodding and cylinders: the oldest and today most conventionally used system. Generally the left and right rodding assemblies of such a system are mechanically linked.

Electric steering system: such as described for instance in document EP-0.300.185, applied to a wheel-chair for handicapped persons, where the two front wheels are coupled, each to a directional motor that is manually activated over a mechanical/electrical transmitter/calculator of the directional angle of the wheels.

Hydraulic steering system: by way of, for example, a hydraulic cylinder system with a straight rack, as described in documents FR1.201.675 or FR-2.694.535 describing a hydraulic transmission by hydraulic cylinder with a piston rod positioned at each of the steering wheels;

Mechanical steering system with a dual rotary steering cam as described in the US-2007/01 44796 document.

Among the systems cited above, the electrical steering, system as described for the wheel-chair mentioned in the EP-0.300.185 document, presents several advantages to meet the requirements at hand, but when one speaks of a vehicle weighing several hundreds of kilograms or even several tons, the electrical systems to deploy (steering motors, electrical drive motors for the wheels, etc.), are certainly feasible with present technologies, but those are complex and expensive solutions, because the currents needed require the set-up of power electronics that are complex and still somewhat unreliable. This is under consideration for all-electric vehicles with only limited range.

As to mechanical steering systems, rodding systems are excluded with respect to the objectives aimed for by the invention and the dual rotary cam systems may well provide solutions for light vehicles such as riding mowers, but they are hardly practical due their complexity on a straddling vehicle that is also capable of adapting to a variety of terrains.

Also, on a straddling, vehicle where traction on the wheels is achieved by hydraulic motors, it would be desirable to make use of the same energy to steer those same wheels.

The hydraulic steering systems that is proposed in document FR2.694.535 is nevertheless not satisfactory because it completes the hydraulic solution with a mechanical rodding assembly at each wheel and does not allow, taking into account the space requirements of the cylinders and said mechanical rodding, to easily achieve turning angles above 90 degrees.

Documents WO-01/25071 and U.S. Pat. No. 2,757,014 describe hydraulic steering systems of prior art.

In the other domains, for the most part already mentioned such as light vehicles (wheel-chairs, riding mowers, etc.) the latter make reference rather to electric or mechanical steering systems for farm or utility, or even military, vehicles.

Apart from the application in the area of light vehicles or that of articulated vehicles with more than two steering vehicles (forest vehicles for example), there is no known hydraulic steering system capable of satisfying the demands for enabling turns with a very small value of turning radius. The aim of the invention is indeed to remedy the drawbacks and insufficiencies of steering systems at the state of the art.

BRIEF SUMMARY OF THE INVENTION

The solution which is the subject of the present invention consists of generating a rotary movement of variable amplitude on a system based on a hydraulic cylinder type component incorporating a linear rack piston system with variable profile (cam rack) and cylindrical gear or not (cam gear) which, through a constant hydraulic outflow, provides this rotary movement of variable amplitude of said gear. And inversely, a continuous rotation of the gear provides a movement of variable translation at the cylinder (principle of the cam associated to a hydraulic module).

The invention is advantageously applicable to the production of hydraulic steering mechanisms of vehicles or self-propelled machines featuring at least two steering wheels and for which one wants to obtain the possibility to make tight turns while respecting the principle of the Jeantaud diagram according to which, in order to avoid slipping during the turn, the four wheels of the vehicle must turn around a same point, i.e., the wheel axes meet at the same point.

The system of hydraulic steering according to the invention features a steering wheel connected to a hydraulic distributor and said system is essentially remarkable for the fact that it comprises at least two hydraulic nodules, each including on the one hand, a module body including an assembly constituted by a double piston integral in translation of a rack, said double piston being housed, with an aptitude of tight sliding, in a cylinder body in which it demarcates two opposing chambers; and on the other hand, a gear meshing with the rack;

the rack and said gear being shaped, and connected, so that any movement of translation of the rack generates, due to the introduction at constant flow, of a hydraulic fluid into one of the chambers, a rotary movement of variable amplitude of said module body or of said gear, the element thus animated by a rotary movement (module body or gear) can be linked to a pivoting organ of a vehicle or self-propelled machine, whereas the non-rotary element (gear or module body) can be attached to a fixed element of said vehicle or said self-propelled machine.

Each of these hydraulic modules being connected, on the one hand, through the intermediary of its pivoting element, to one of the steering wheels of the vehicle and on the other hand, through the intermediary of its fixed organ, to the chassis of said vehicle, and in that said distributor is connected to one of the two chambers delimited by the rack piston of each module, the second of said chambers of each of the modules communicating with the other.

According to one implementation, the body of each module is linked to a mobile organ of a vehicle or self-propelled machine, while the gear is rigidly fastened to a fixed element of said vehicle or self-propelled machine.

According to another implementation, the gear is linked, to a mobile organ of a vehicle or self-propelled machine, while the module body is integrated with a fixed element of said vehicle or self-propelled machine.

According to one implementation, the rack is constituted by an intermediary element positioned between the two pistons forming the opposing ends of the mobile assembly of a hydraulic rack cylinder.

According to another implementation, one of the ends of the rack is linked to the double-acting piston of a hydraulic cylinder through the intermediary of the rod of this piston, said hydraulic cylinder being positioned outside of the body in which the rack is housed and in the longitudinal extension of this body.

According to another implementation, the gear is engaged with the toothing of two parallel, inversely oriented racks.

According to one implementation, the toothing of the rack of the double rack piston presents a variable linear profile.

According to another possible implementation, the toothing of the rack of the double rack piston presents a straight line profile.

According to another implementation, the gear meshing with the rack of the double rack piston is a circular, eccentric gear.

According to another possible implementation, the gear meshing with the rack of the double rack piston is a cam gear.

According to one implementation, the gear is kept engaged with the toothing of the rack or racks through the intermediary of elastic means acting in traction or compression.

According to a preferred implementation, each hydraulic module comprises:

a module body, including a double-acting hydraulic cylinder featuring a hollow cylindrical body in which is housed, with an aptitude of tight sliding, a double piston constituted by a piston with a linear rack of variable profile or a cam rack, this piston delimiting two chambers inside said body, the opposing ends of which are provided with an opening connected to a hydraulic distributor which makes it possible to control the inflow of hydraulic fluid into one of said chambers as well as the outflow from the second of these chambers, in equal amounts of said hydraulic fluid;

and a cylindrical gear that is eccentric relative to the rotary axis of the module body, meshing with the rack of the double rack piston or a cam-shaped piston;

so that in the case where the gear is fixed and the module body is mobile around said gear, the continuous motion of the rack piston inside the body of the cylinder results in a toggling movement of variable amplitude of said module body around said gear, with a constant flow of hydraulic fluid introduced in one of the cylinder chambers, whereas in the case where the module body is fixed and the cylindrical gear, either eccentric or cam-shaped, is mobile, the continuous motion of the rack piston in the cylinder body results in a rotary movement of variable amplitude of said gear.

One realizes that by linking the module body to a wheel of the vehicle, while the gear is rigidly fastened to the vehicle structure, it is possible to communicate a rotary movement of variable amplitude to this mobile organ with a constant flow of fluid which can be controlled with a simple hydraulic distribution system.

Preferably the module body of each module pivots and is linked to one of the steering wheels of the vehicle, while the eccentric gear, either cylindrical or with a cam profile, of said module is solidly secured on the chassis of said vehicle.

According to another implementation, the module body of each module is fixed and rigidly integral with the chassis of the vehicle, while the eccentric gear, either cylindrical or with a cam profile, of said module is integral with one of the wheels of the vehicle.

Advantageously, the hydraulic distributor is preferably constituted by a rotary hydrostatic distributor, such as for example a rotary hydrostatic servocontrol, known as such under the name of "orbitrol".

Interestingly, each module features a system of stops that is adjustable in translation, thereby enabling adjustment of the maximal turning angle to stop the pivoting organ in its position of maximum steeling while maintaining the circulation of the hydraulic fluid through the module.

According to another characteristic arrangement, this system of stops comprises a check valve which is adjustably located axially to the ends of the cylinder body and positioned opposite a rod or pin linked to the rack piston, actuating, at its limit position, said check valve and thereby directing the flow of the hydraulic fluid upstream of the piston directly towards the second module. The turn angle can thus be managed by an adjustment in translation of the position of the check valve.

BRIEF DESCRIPTION OF THE SEVERAL VIEWS OF THE DRAWINGS

The aims, characteristics and advantages of the hydraulic steering according to the invention will become clearer from the following description and the attached drawings in which:

FIGS. 12C and 12D are schematic views showing the position of the modules and the racks of the latter, during a straight line movement of a vehicle.

FIGS. 12E and 12F are schematic views analog to FIGS. 12C and 12D and showing the position of the modules and the racks during a turn to the left.

FIGS. 13A, 13B, 13C, illustrate the operation of the devices fitted on the modules of hydraulic steering for the purpose of obtaining a setting of the value of the turn angle of the steering wheels of a vehicle.

FIGS. 14A, 14B, 14C, are detail views, in axial cross section, illustrating the adjustment devices of the stops of a module.

FIGS. 15A, 15B, 15C, are detail views, in axial cross section, showing the operation of the stops.

DETAILED DESCRIPTION OF THE INVENTION

Figure 1:
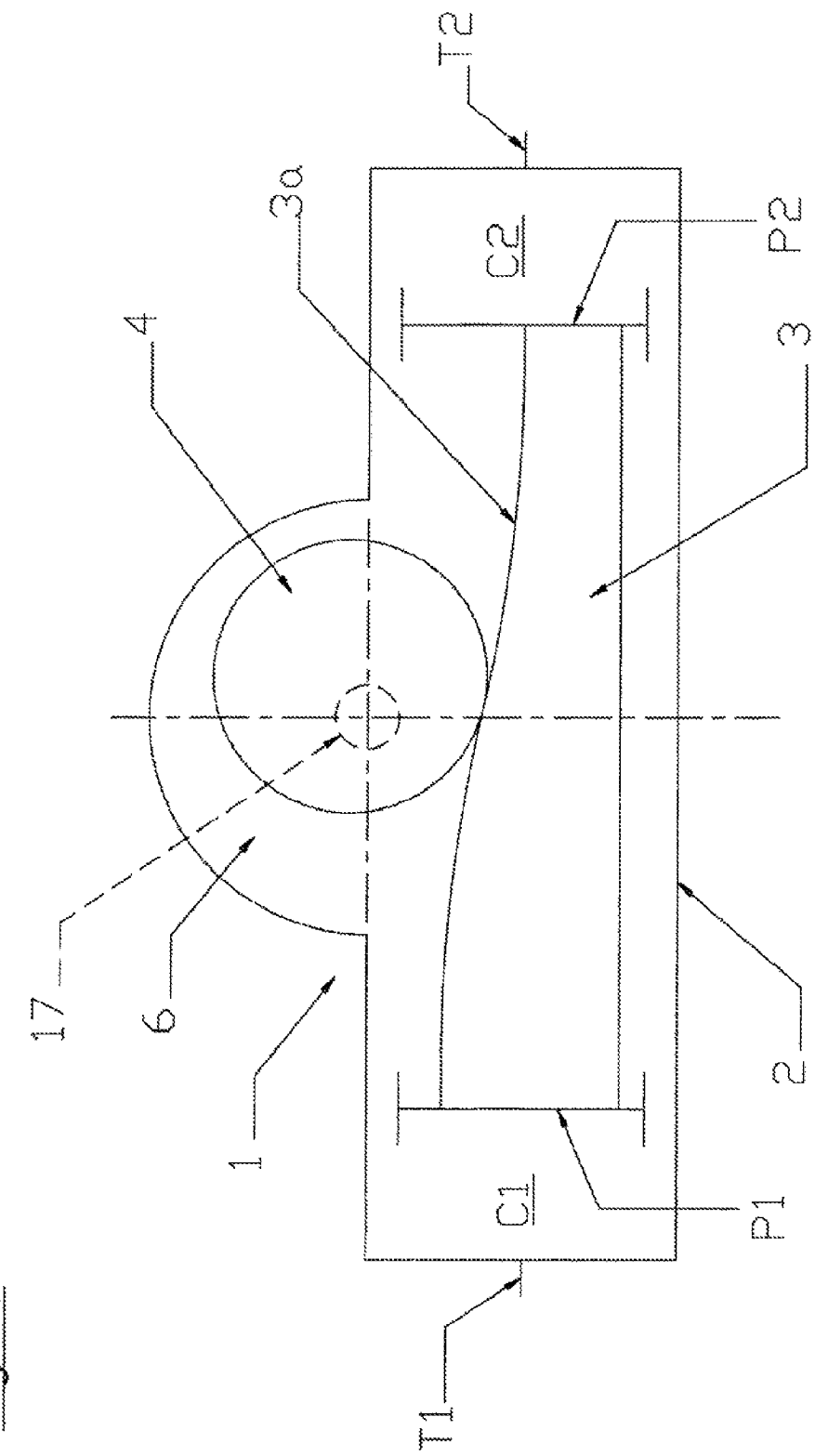
FIG. 1 is a schematic view illustrating a first example of implementation of one of the hydraulic modules for the hydraulic steering according to the invention which features two identical modules.

Reference is made to said drawings to describe interesting, although by no means limiting examples of implementation of hydraulic steering of vehicles or self-propelled machines, comprising at least two identical hydraulic modules 1a, 1b, examples of which are shown in FIGS. 1 to 9.

Each hydraulic module 1, 100, 200, 300 is particularly remarkable in that it comprises, on the one hand, at least one rack 3, 103, 203, 303a, 303b, housed, with an aptitude of longitudinal translation, in a module body 6, 106, 206, 306 and the toothing 3a or 3b of which presents a variable linear profile (FIGS. 1, 4, 5) or a straight line linear profile (FIGS. 2 and 3), and, on the other hand, an eccentric circular gear 4, 104 or presenting, a cam shape, meshing with this rack which is solidly fastened to a double piston P1, P2; P3, P4; P5, so that longitudinal movements of translation can be communicated to it, said rack 3, 103, 203, 303a, 303b and said gear 4, 104 being shaped and connected so that any translation movement, of the rack, from the introduction at constant flow of a hydraulic fluid into one of the variable volume chambers C1, C2; C3, C4; C5, C6, delimited by the active faces of said double piston P1, P2; P3, P4; P5, generates a rotary movement of variable amplitude of said module body 6, 106, 206, 306 or of said gear 4, 104, the element thus animated (module body 6, 106, 206, 306 or gear 4, 104) can be linked to a pivoting organ of the wheel of a vehicle V, while the non-rotating element (gear 4, 104 or module body 6, 106, 206, 306) can be attached to a fixed element of the chassis of said vehicle.

According to the implementations illustrated in FIGS. 1, 2, 3, and 5, the rack 3, 103, 303a, 303b is constituted by the intermediary element or rod connecting the pistons P1 and P2 or P3 and P4 forming the ends of the mobile assembly of a rack cylinder and double-acting, this assembly being housed, with an aptitude of tight sliding, in a cylindrical jack body 2, 102, 302a, 302b.

Figure 4:
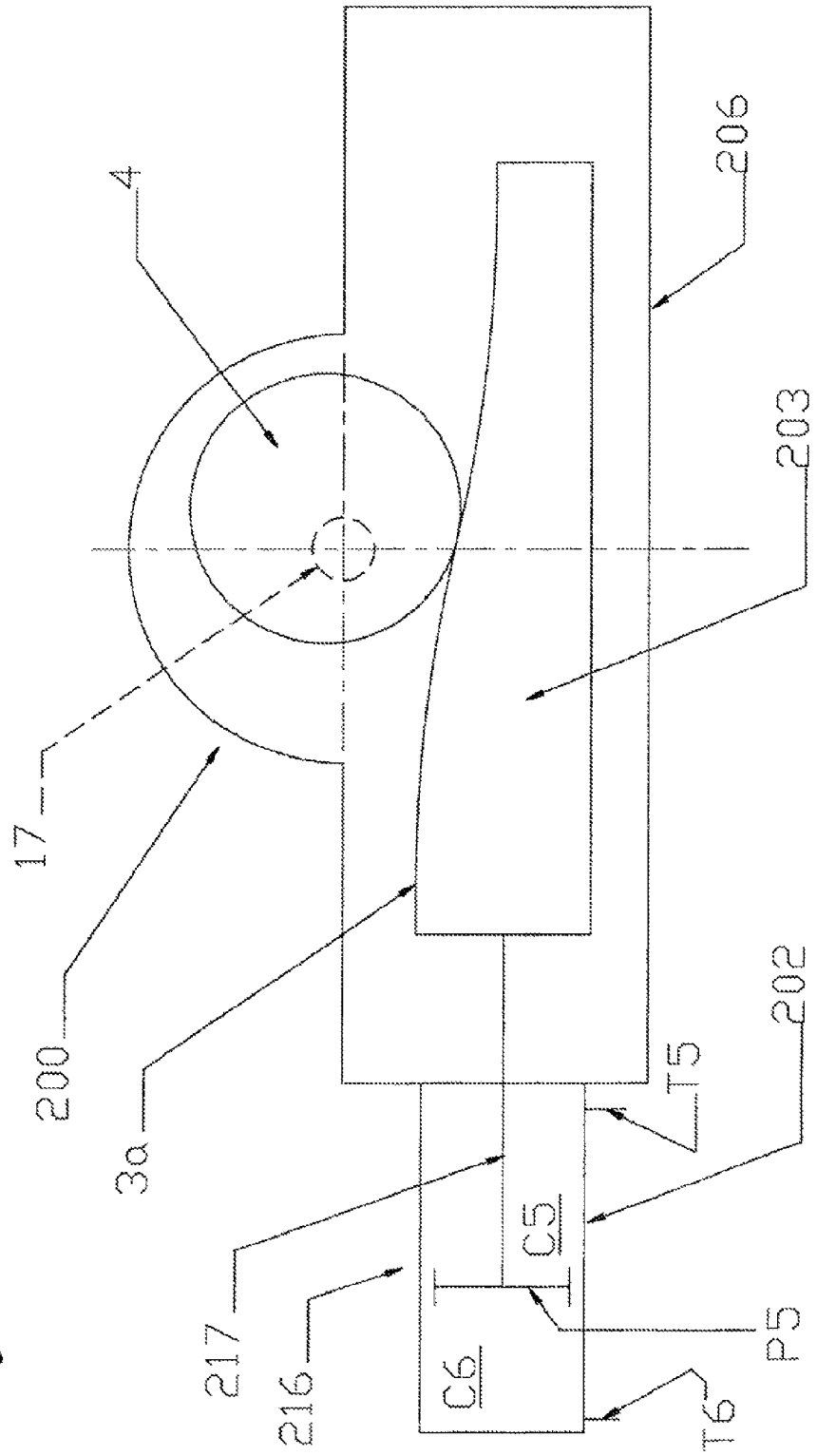
FIG. 4 is a schematic view of a fourth example of implementation of this module.

According to another implementation shown in FIG. 4, one of the rack ends 203 is linked to the double-acting piston P5 housed with an aptitude of tight sliding in the body 202 of a hydraulic cylinder 216 through the intermediary of the rod 217 of the piston of said cylinder.

According to this implementation, the hydraulic cylinder 216 is located outside of the housing with elongated shape of the module body 206 in which is mounted rack 203 with latitude of longitudinal movement. In this case, the hydraulic cylinder 216 is positioned in the extension of said housing and extends at the exterior from one of the ends of the latter. The cylinder 216 comprises single, double-faced piston P5 capable of moving by tight sliding in a cylinder body 202 and delimiting the chambers C5, C6.

Figure 5:
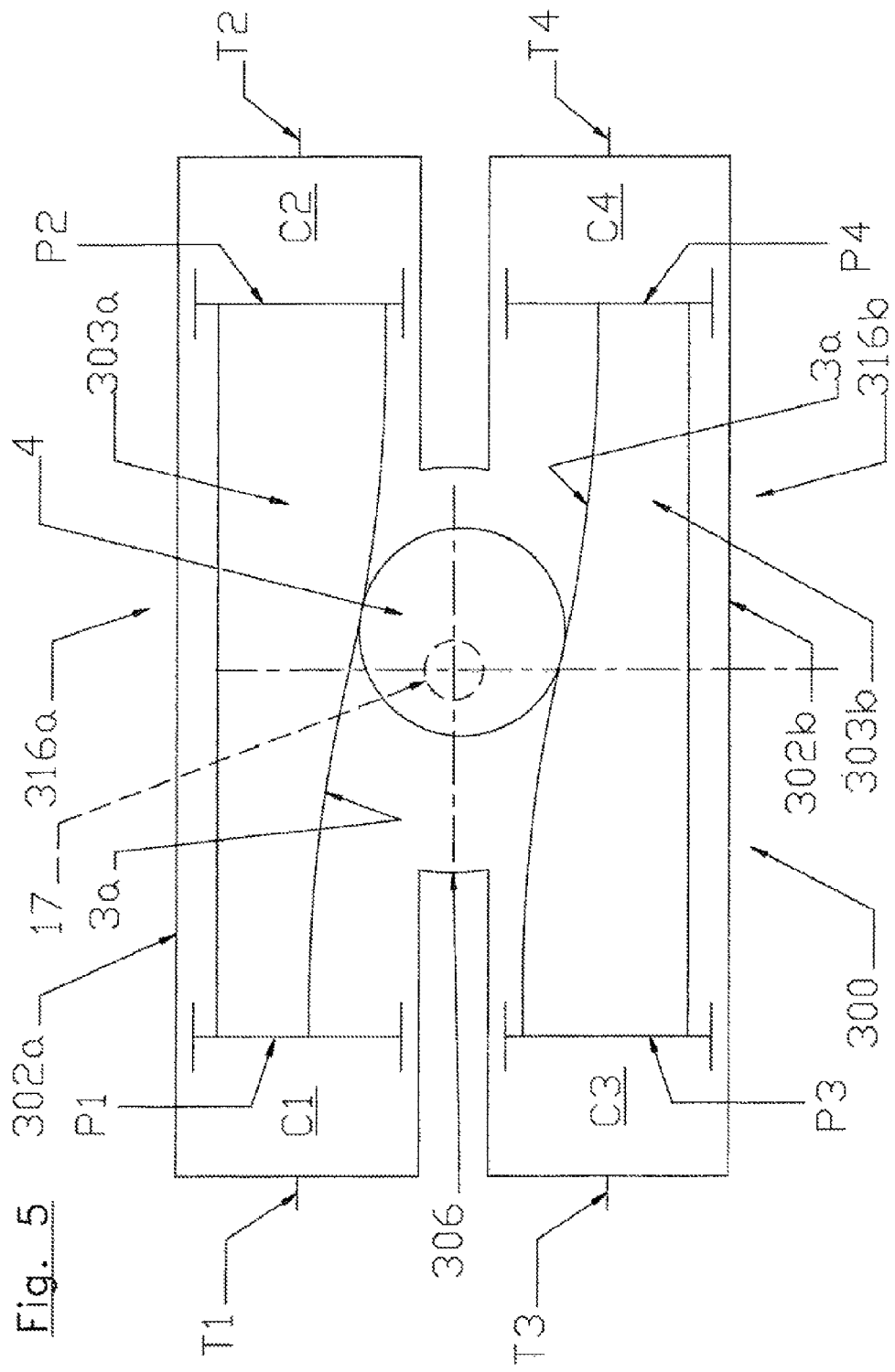
FIG. 5 is a schematic view of a fifth example of implementation of this module.
Figure 6:
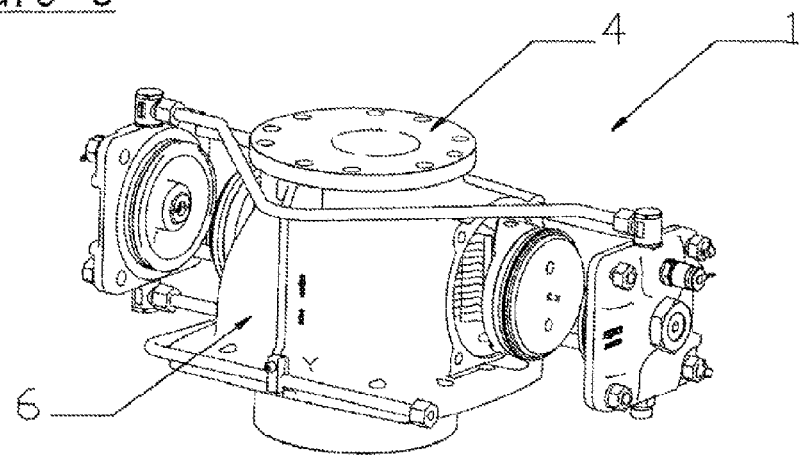
FIG. 6 is a perspective view of another example of implementation of said hydraulic module.
Figure 7:
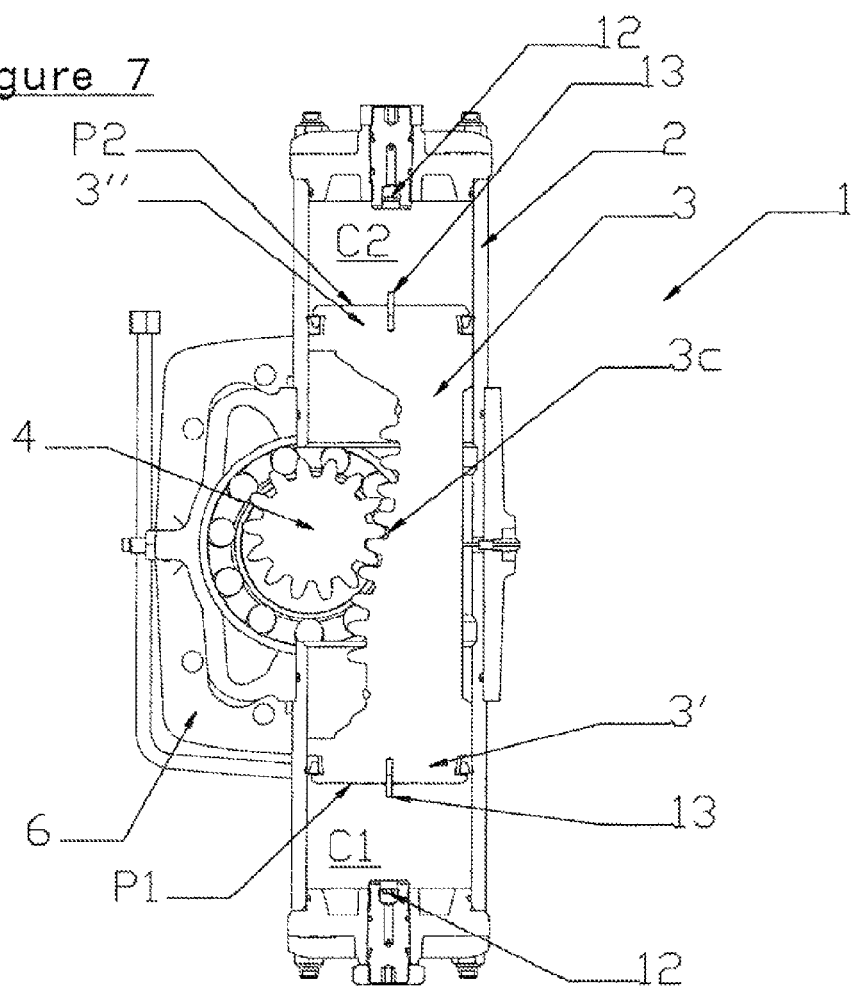
FIG. 7 is a longitudinal cross section of the major functional components of the module.

According to another implementation shown in FIG. 5, the eccentric gear 4 is engaged with the variable profile toothing of two inversely oriented racks 303a, 303b. In this case the module comprises two parallel hydraulic cylinders 316a, 316b, each featuring two pistons P1, P2; P3, P4 that are fastened to the ends of a linear rack 303a or 303b, with variable profile 3a or straight line profile. The mobile assemblies of piston P1-rack 303a-piston P2 and piston P3-rack 303b-piston P4 being mounted with an aptitude of tight sliding in bodies of paired cylindrical cylinders 302a, 392b, the two paired cylinders 316a, 316b being equipped with identical operating characteristics. The gears P1 to P4 delimit variable volume chambers, C1 to C4 respectively.

Particular advantages of this implementation are:
reduced pressure in each of the chambers delimited by the pistons; and
distributing the forces exerted on the toothing of the racks 303a and 303b.

According to the implementation illustrated in FIGS. 1, 4, and 5, the toothing 3a of rack 3, 203, 303a, 303b of the double rack pistons P1-3-P2; P1-303a-P2; P3-303b-P4 or linked to the double-acting piston P5, presents a variable profile.

Figure 2:
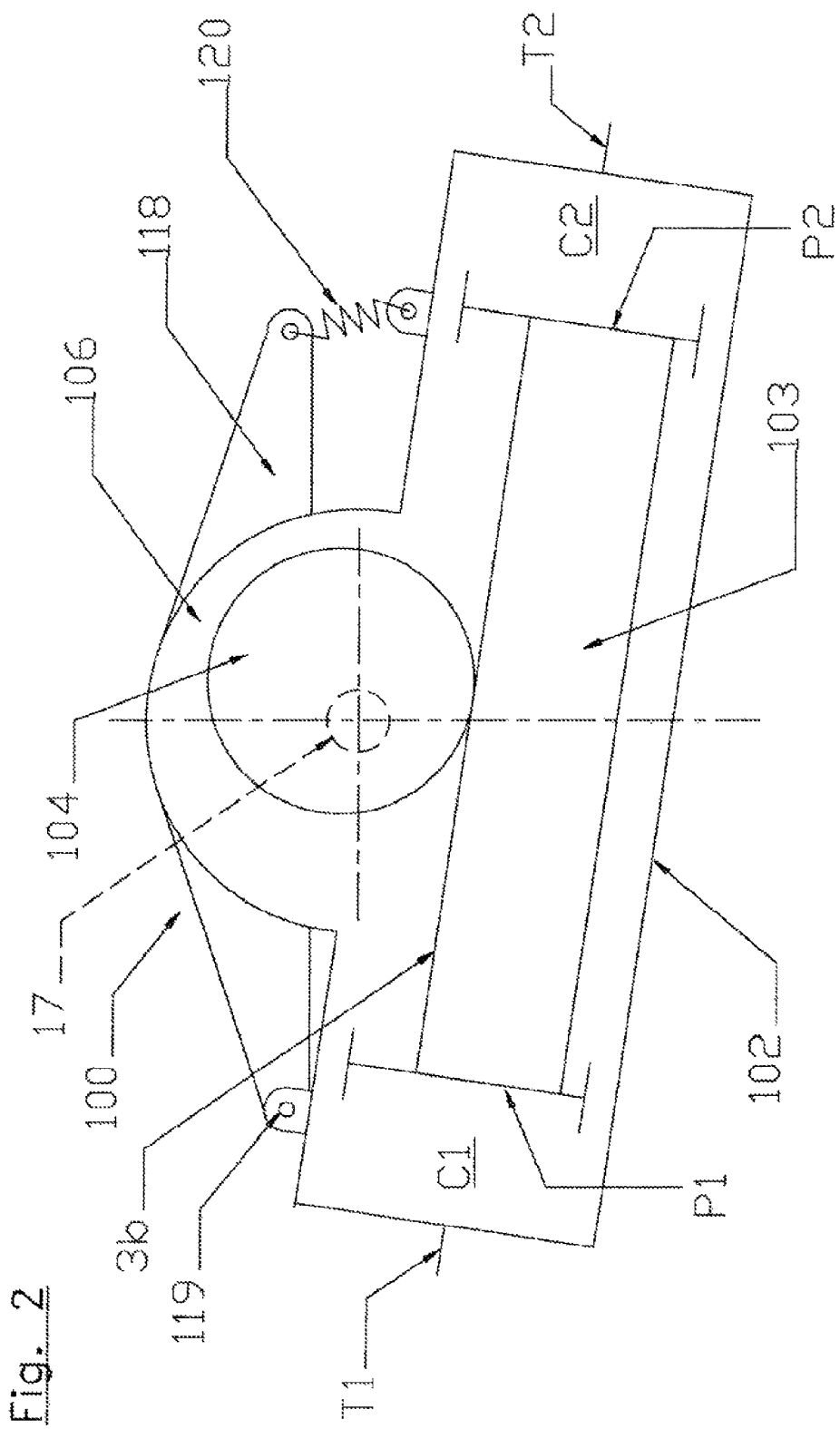
FIG. 2 is a schematic view of a second example of implementation of this module.
Figure 3:
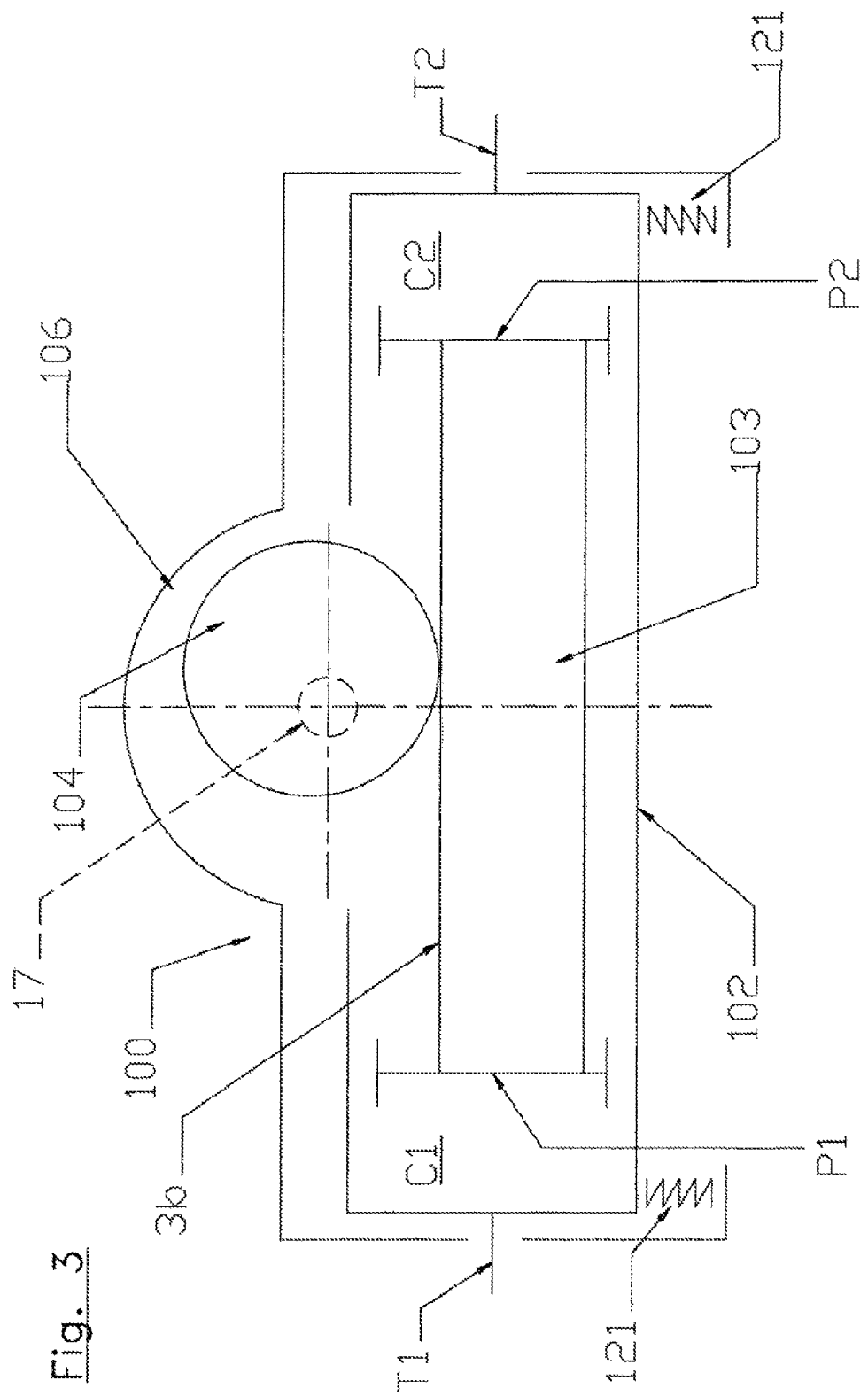
FIG. 3 is a schematic view of a third example of implementation of this module.

According to another implementation shown in FIGS. 2 and 3, the toothing 3b of the rack of the double rack piston P1-103-P2 presents a straight line profile.

According to the example of implementation illustrated in FIG. 2, gear 104 is kept in mesh with the toothing 3b of the rack 103 of the double rack piston P1-103-P2 through the intermediary of elastic means.

According to this figure, these means consist of springs acting under tension. In this case, axis 17 of gear 104 is supported by a tilting bracket 118 fixed to the body of module body 106, through the intermediary of one of its ends and by means of an articulation 119, and of which the other opposing end is linked to the module body by one or several tension springs 120.

According to FIG. 3, the elastic means ensuring the continued meshing of gear 104 and toothing 3b of the rack 103 of the double gear P1-103-P2 are constituted by one or several springs 121 acting in compression.

On the diagrams of FIGS. 1, 2, and 3, the references T1 and T2 designate the ends of tubing communicating with the chambers C1 and C2, respectively. On the diagram of FIG. 4, the references T5 and T6 designate the ends of tubing communicating with the chambers C5 and C6 respectively. On the diagram of FIG. 5, the references T1, 12, T3, and T4 designate the ends of the tubing communicating with the chambers C1, C2, C3, and C4 respectively.

According to the examples of implementation ration illustrated in FIGS. 1 to 9, considered in their application to the execution of hydraulic steering of vehicle V, according to the invention, this hydraulic steering comprises at least two hydraulic modules 1a, 1b, each featuring:
a module body 6, 106, 206, 306;
at least one double-acting hydraulic cylinder featuring a hollow, cylindrical body of an elongated shape 2, 102, 202, 302 in which is housed, with an aptitude of tight sliding, a double piston featuring a linear rack with a variable profile or a cam rack 3, 203 303a, 303b (FIGS. 1, 4, and 5) or with a straight line profile 103 (FIGS. 2 and 3); said double piston with rack delimits two opposing chambers C1, C2; C3, C4 et C5, C6 inside said body, the opposing ends of which are provided with an opening (not shown) communicating with said chambers, one of these chambers is connected to a hydraulic distributor enabling the control of the inflow or outflow of the hydraulic fluid and the other chamber enables, simultaneously and inversely, the evacuation or input of an equal volume of said hydraulic fluid; and,
a gear 4, 104 that is eccentric relative to the rotational axis of the module body, meshing with the variable or straight line profile rack connected to said double piston.

Preferably, the cylindrical gear, either eccentric or with a cam profile 4, 104 is rigidly integral with a fixed element of the chassis of the vehicle, while the module body 6, 106, 206, 306 that is mobile around a rotational axis, is fixedly connected to one of the steering wheels 5a, 5b on vehicle V.

Inversely, the module body 6, 106, 206, 306 could be rigidly integral with a fixed element of the chassis of vehicle V, whereas the cylindrical gear, either eccentric or with a cam profile 4, 104, would, in this case, be fixedly linked to one of the steering wheels 5a or 5b of said vehicle V.

Figure 9:
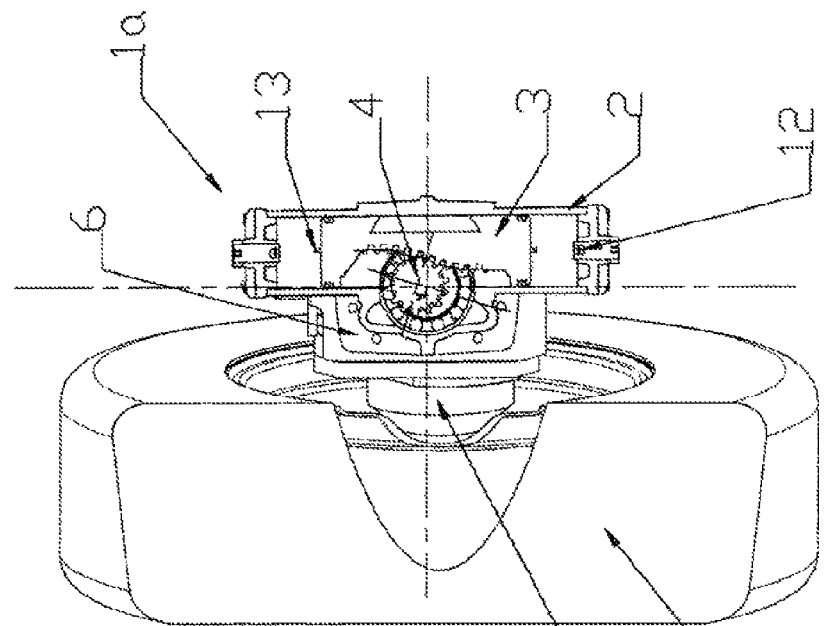
FIG. 9 is a perspective view with partial sections, showing this installation in greater detail.
Figure 8:
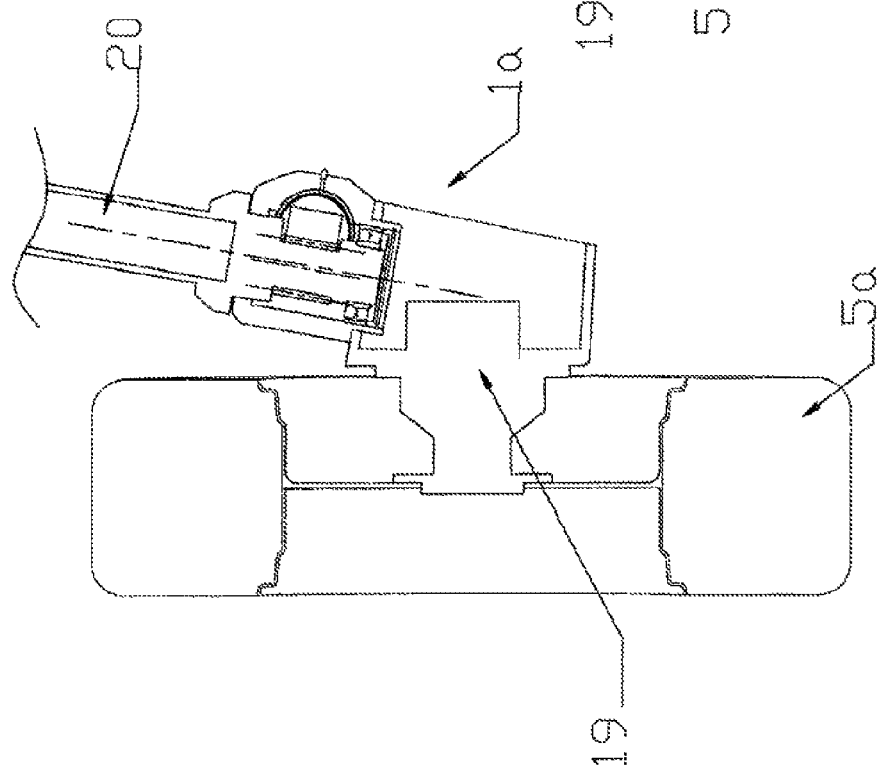
FIG. 8 is a front view, in cross section and as a schematic, showing the installation of a hydraulic module on a vehicle wheel.

In the application to the hydraulic steering of vehicle V, the module body 6, 106, 206, 306 is rigidly fixed to one of the steering wheels 5a or 5b of said vehicle, for example through the intermediary of a rotating frame 19 (FIGS. 8 and 9). On the other hand, gear 4, 104 meshing with toothing 3a, 3b of the rack 3, 103, 203, 303a, 303b of the mobile assembly P1-3-P2 or P1-103-P2 or P5-203 or P-303a-P2, P3-303b-P4 of each cylinder, is rigidly fixed on an element of the chassis of vehicle V, for example on a fixed strut 20, for example through the intermediary of its axis 17.

One realizes that when the rack piston P1-3-P2 or P1-103-P2 or P5-203 or P1-303a-P2, P3-303b-P4 is displaced in the body 2, 102, 202, 302a-302b of one of the rack cylinders, through the intermediary of a displacement of a quantity of hydraulic fluid contained in the chambers C1 and C2, C3 and C4 or C5 and C6 of said cylinder, this displacement generates a swiveling motion of said rack around the gear 4, 104 and, consequently, a swiveling motion of the assembly 3-6 linked to wheel 5a or 5b, providing the rotation of said wheel and thus generating a turn to the right or the left of the latter depending on the direction of the swiveling motion of said assembly 3-6.

It also becomes clear that the combination of the particular geometry of the piston rack and the gear, associated with the off-centering of said gear relative to the rotational axis of the module, enables the necessary angle variation at each of the wheels so as to satisfy the Jeantaud diagram at any point along the turn.

Figure 10:
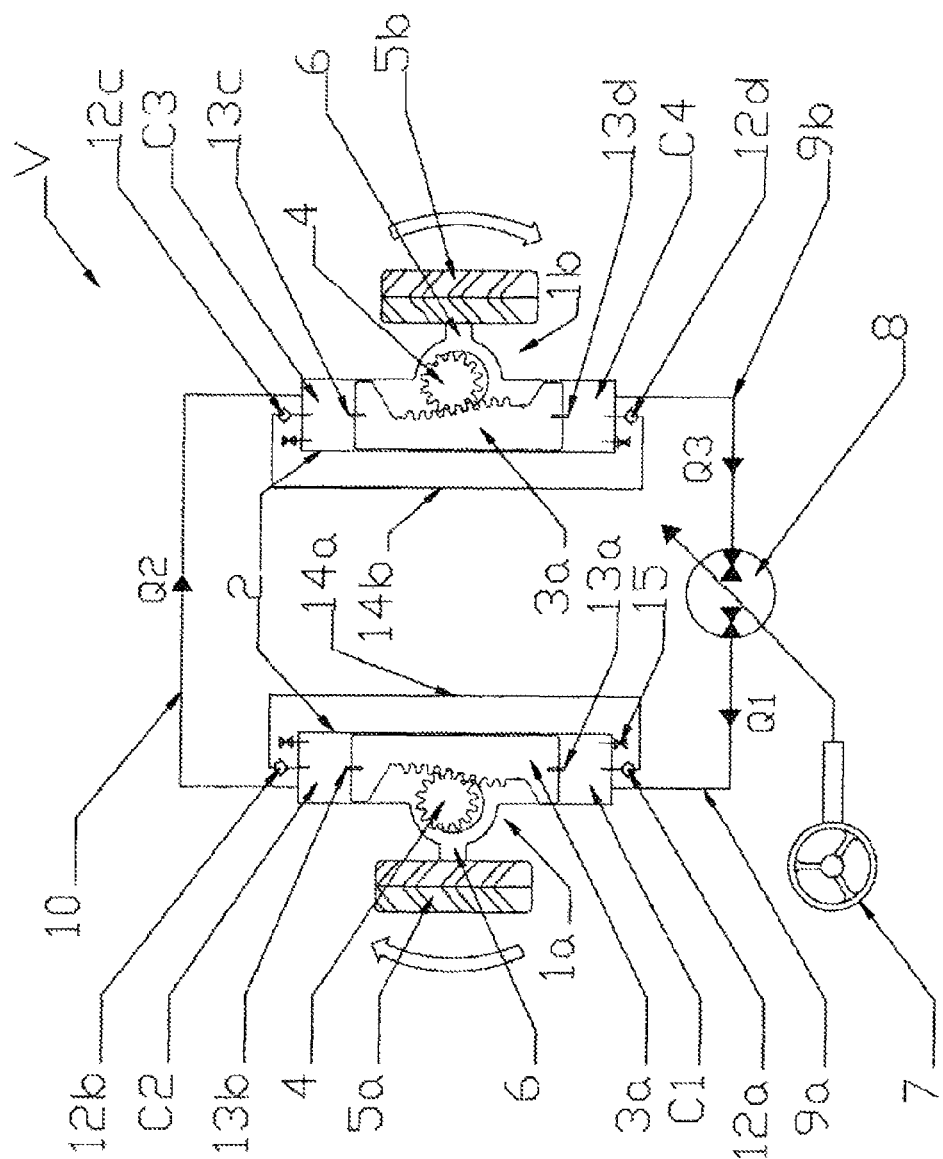
FIG. 10 is a schematic type view illustrating an example of hydraulic vehicle steering produced in conformity with the invention.

One example of implementation of the hydraulic steering of the vehicle is illustrated in FIG. 10. According to this example, the hydraulic steering comprises a steering wheel 7 controlling the operation of a rotary hydraulic distributor 8 and this hydraulic steering is especially remarkable in that it comprises at least two hydraulic modules 1a and 1b featuring the afore-mentioned characteristics.

These modules 1a and 1b ensure the turning of at least two steering wheels 5a and 5b of vehicle V or self-propelled machine. They are positioned on both sides of the axis of the vehicle and, according to the advantageous example illustrated in FIGS. 8 and 9, each of them is linked, on the one hand through the intermediary of in pivoting assembly 3-6 to one of the wheels 5a or 5b and, on the other hand, rigidly fixed through the intermediary of gear 4, on the chassis of vehicle V or on an element that is rigidly integral with said chassis (not shown).

However, it would also be possible to link each module 1a and 1b, on the one hand, through the intermediary of gear 4, to one of the wheels 5a or 5b, and, on the other hand, to rigidly fix the assembly 3-6 on the chassis of vehicle V or on an element that is rigidly integral with said chassis.

Reference is made to diagram in FIG. 10 to describe the operation of the modules 1a, 1b in the application to the hydraulic steering all vehicle V. This operation is performed by the hydraulic distributor 8 which is linked to one of the chambers C1 or C4 or said modules by appropriate piping 9a, 9b, respectively.

The opposing chambers C2 and C3 of modules 1a, 1b, respectively, are interconnected by means of a duct 10.

Advantageously, the distributor 8 is constituted by a hydrostatic distributor and more precisely a rotary hydrostatic distributor.

For example, this distributor consists of a rotary hydrostatic servo control, known as such under the name of "orbitrol".

When the middle of the rack piston 3 is positioned in coincidence with the middle of the cylinder body 2, it delimits, inside the latter, two chambers C1 and C2 or C3 and C4 of identical cross section and length and consequently of equal volumes. In this position the steering wheels 5a, 5b of vehicle V are oriented parallel to its axis A-A and the angle of the turn radius of said wheels is zero (FIG. 12D). However, this orientation of the steering wheels could be obtained by other means than the afore-mentioned position of the rack piston in the cylinder body.

When the driver of the vehicle turns the steering wheel 7 of the hydraulic steering, for example to have the vehicle make a right turn, said steering wheel actuates the hydraulic modules 1a, 1b, through the intermediary of the hydraulic distributor 8 that is directly connected to said modules.

While considering the example represented in FIG. 10, the hydraulic distributor 8 allows, when the steering wheel 7 is turned to the right, directing a volume of oil Q1, in chamber C1 of the steering module 1a linked to the left wheel 5a of vehicle V, thereby pushing the rack piston 3 of this module forward. This results in a volume of hydraulic fluid Q2, coming from chamber C2 of module 1a, being transferred into chamber C3 of the hydraulic module 1b linked to the right wheel 5b of the machine, which leads to the displacement of the rack piston 3 of said module 1b backwards. This results also in a volume of oil Q3 being evacuated, from chamber C4 of module 1b and returned towards the hydraulic distributor 8 linked to the steering, wheel 7.

Since the sections of the four chambers C1, C2, C3, C4 are constructed identically, it is clear that Q1=Q2=Q3. Furthermore, the forward displacement of the double piston P1-3-P2 of module 1a, linked to the left wheel 5a. of vehicle V generates a rotation of rack 3 of this double piston around the eccentric gear 4 which is fixed relative to the chassis of the vehicle, the meshing of rack 3 and said fixed piston forcing the module body 6 of the steering module and hence also the wheel 5a to make a turn towards the right; on the other hand, the displacement towards the back of the double piston P1-3-P2 of module 1b linked to the right wheel 5b of vehicle V, which results from the introduction of a volume of oil into the chamber C3 of the steering module 1b, causes the tilting of wheel 5b towards the right and consequently the overall turn of the vehicle towards the right.

Figures 11A, 11B:
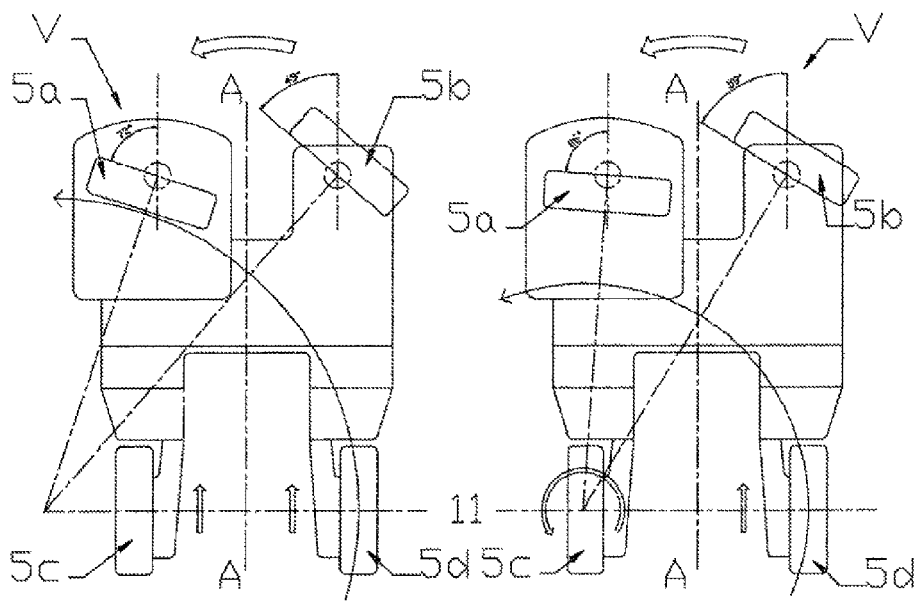
FIGS. 11A, 11B are schematic type views illustrating the limited turning angle obtainable with conventional hydraulic steering.

The schematic FIGS. 11A, 11B, show the turning angles of limited amplitude that can be obtained with conventional hydraulic steering. On these figures and the diagrams of FIGS. 12A, 12B, 12C, 12D, 12E and 12F, the references 5c and 5d designate the non-steering rear wheels of vehicle V.

FIG. 11A illustrates the "normal" left turn of a machine equipped with conventional hydraulic steering with the rotational center of the machine to the left of the machine on the rear axle. The right rear wheel 5d turns in the forward direction just like the two front wheels. The left rear wheel Sc also turns in the forward direction. If the front and rear wheel tracks are the same, the turn angle of the left wheel is less than 90°.

FIG. 11B shows a "maximum" left turn of a machine with the rotational center of the machine on the rear axle, on the center of the left rear wheel. The right rear wheel 5d turns in the forward direction, just like the two front wheels. The left rear wheel 5c is stalled. If the front and rear wheel tracks are the same, the turn angle of the left wheel is equal to 90°.

Figures 12A, 12B:
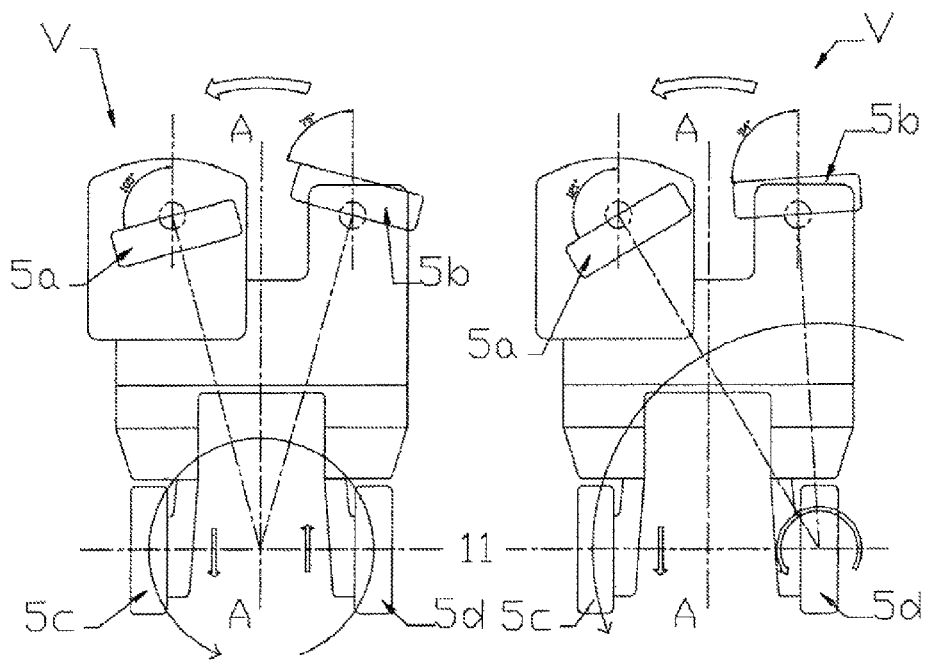
FIGS. 12A, 12B are schematic type views illustrating the significant turning angles obtainable with hydraulic steering according to the invention.

FIGS. 12A, 12B, are schematic views, showing significant turn angles that can be obtained with the hydraulic steering mechanism according to the invention.

FIGS. 12E and 12F are views identical to FIG. 12A, but with illustration of the modules and the position of the racks, FIG. 12D representing a visualization of the machine in a straight line and a visualization of the racks in this position.

FIGS. 12E and 12F clearly show that the hydraulic steering system according to the invention is perfectly appropriate for obtaining turn angles of the steering wheels 5a, 5b of vehicles or other self-propelled machines, with angles that can be significantly above 90°, relative to the axis of said vehicles. This hydraulic steering allows placing the turning radius in the center of the rear axle 11 of vehicle V (FIGS. 12A, 12E and 12F) representing the smallest turn radius possible of this type of vehicle. Compared to the limits of the turning angle that can be obtained with a conventional hydraulic steering system such as represented in FIG. 11B (left wheel mined at an angle of 86°, right wheel turned at an angle of 59°), the hydraulic steering according to the invention provides the possibility for very significant turning angles allowing changes of direction with large turning angles, requiring thereby a minimized maneuvering space on the ground.

The maximal steering angle of the wheels is simply defined by the length of the rack, that of the cylinder piston, coupled to the parameters of shape, cylindrical or with cam profile, as well as the eccentricity of the gear relative to the rotational axis of the module that could be dimensioned so as to obtain a complete turn, even several turns of the modules, although this would be useless in the application of hydraulic steering as per the invention.

Hydraulic steering according to the invention comprises means for setting the value of the maximal turn angle of the steering wheels 5a, 5b.

These means comprise (FIGS. 13A 13B and 13C):
- on the one hand, check valves 12 (12a, 12b, 12c, 12d), equipping, preferably axially, the opposing ends of the cylinder body 2 of modules 1a and 1b; and,
- on the other hand, a rod or pin 13 (13a, 13b, 13c, 13d) supported by the opposing ends 3', 3", of the rack prison 3, preferably axially, this rod or pin being oriented in the direction of the ends of the cylinder body 2.

In this way said check valves 12 and said pins 13 are in alignment.

At its course limit, and depending on its direction of displacement, piston 3, through the intermediary of one of its pins 13 actuates the corresponding check valve positioned opposite the pin.

The check valves (respectively 12a-124-12b and 12c-12d) provided at the ends of the left module 1a and the right module 1b are mounted so they are axially adjustable with appropriate means known as such, for example a screw-nut system. In this way, the maximal turn angle can be managed by a translatory setting of the position of the check valves. The initial setting of their parallelism is simply made by adjusting said check valves. FIGS. 14A, 14B and 14C illustrate the example of a reduced setting of the maximal turn angle by positioning the rack in a not extreme position (FIG. 14A), then by the translatory adjustment of the position of the valve towards the inside of the cylinder body so as to meet up with said rod or said pin (FIG. 14B) and continue the action so as to actuate said valve at its limit (FIG. 14C).

Operation of these means of adjustable stops which allow setting the maximal turn angle of the steering wheels of vehicle V is as follows, referring to FIGS. 13A to 13C, with FIGS. 15A, 15B and 15C illustrating the details of the operation of these stops.

Figure 13A:
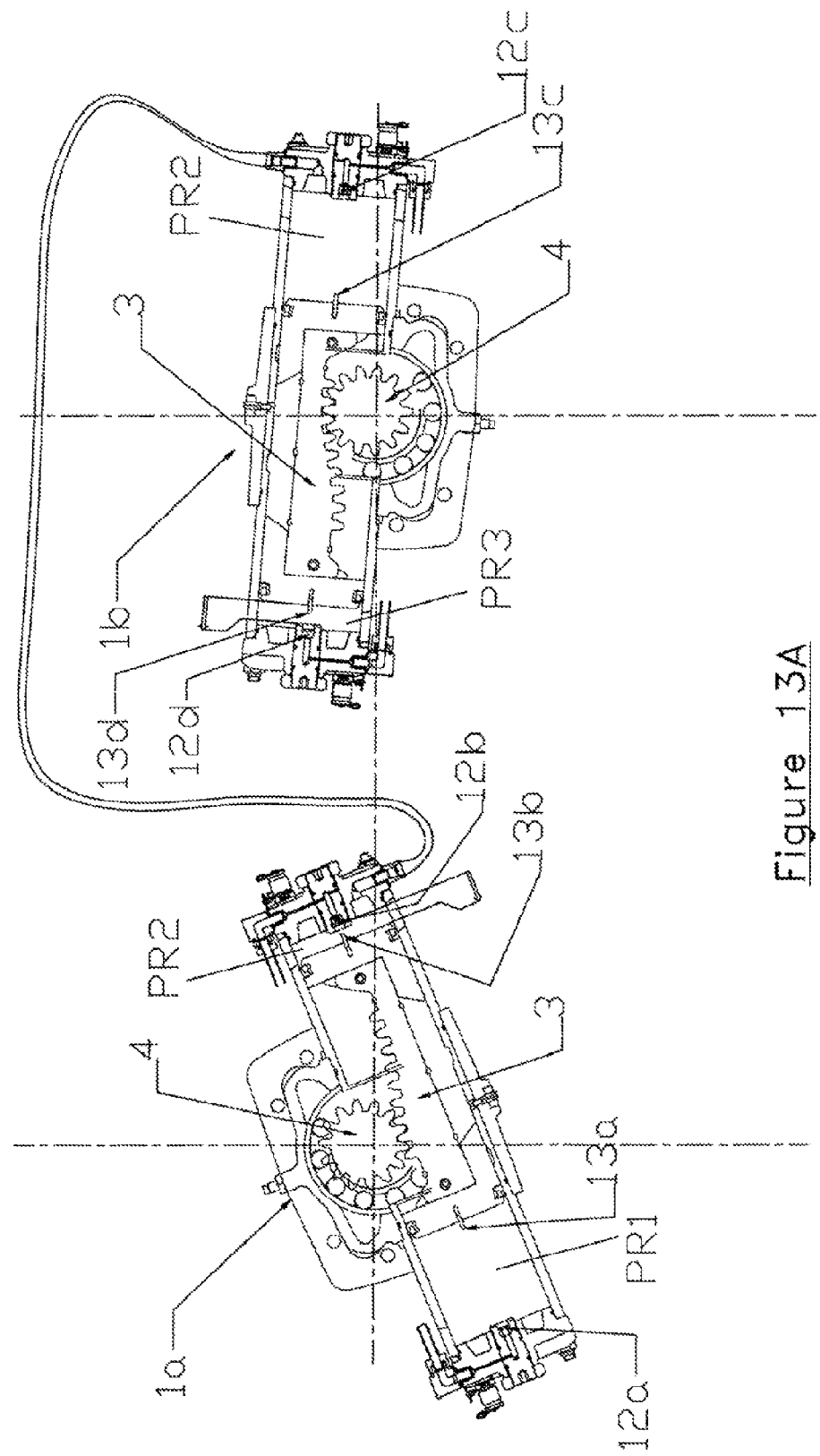

In FIGS. 13A and 15A, the double piston of the left module 1$a$, and the double piston of the right module 1$b$ have almost reached their limit, according to which the rack piston of said left module is moved forward, while:
- chamber C1 of module 1$a$ is at a pressure PR1;
- chamber C2 of module 1$a$ and chamber C3 of module 1$b$ are at a pressure PR2;
- chamber C4 of said module 1$b$ is at a pressure PR3.

Fluid transfer between chambers C1 and C2, or C3 and C4 is not possible, thus forcing the mobility of the pistons of each module depending on the hydraulic flow of chambers C1 and C4.

Figure 13B:
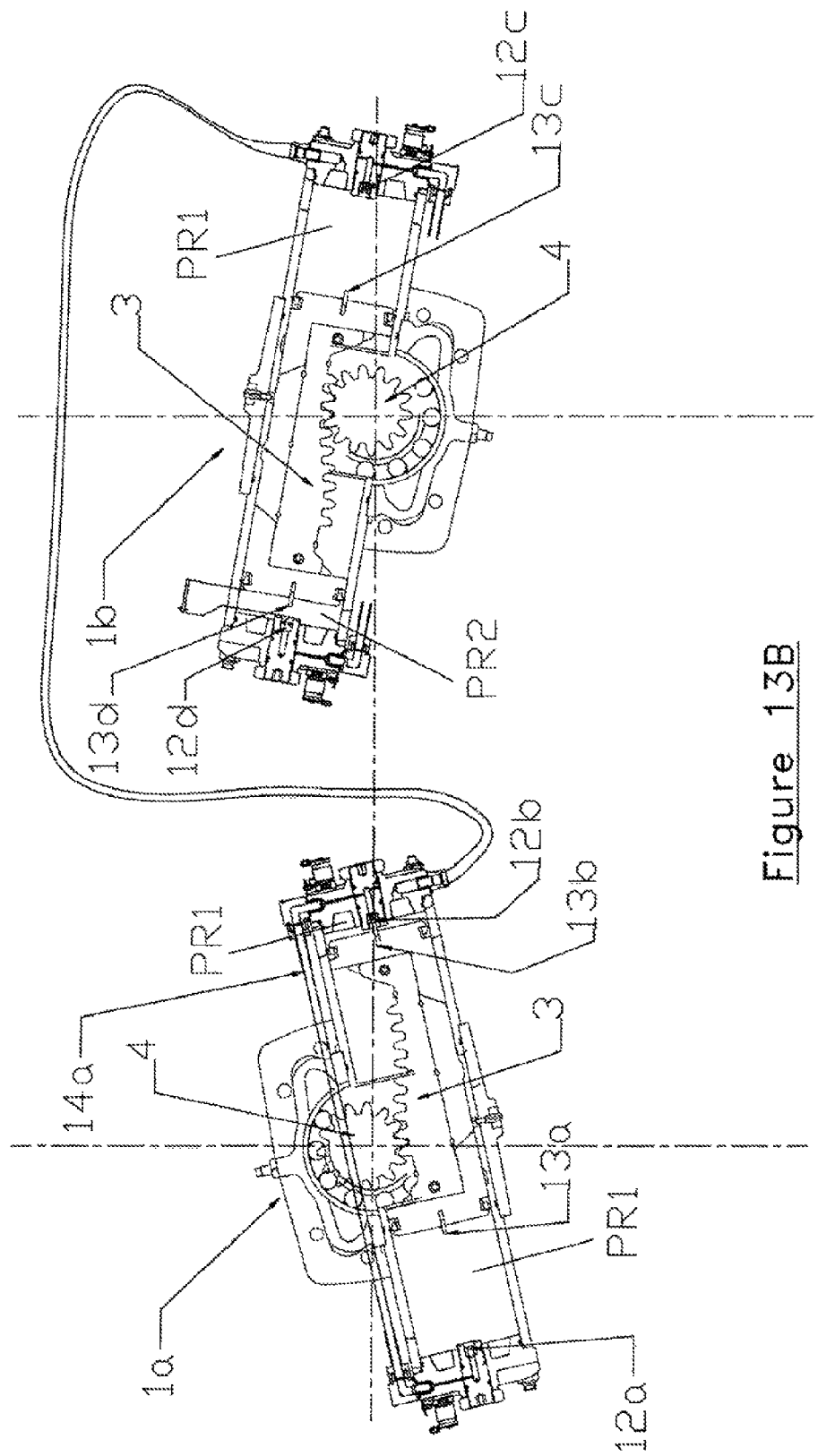

According to FIGS. 13B, 15B the double piston of the left module 1$a$ has reached the limit stop and the check valve 12$b$ opened under the action of the rod 13$b$ (FIG. 15C). Chamber C1 and chamber C2 are put in communication via the tubing 14$a$ linking the check valves (12$a$-12$b$) providing access to said chambers. In this situation:
- chamber C1 is at a pressure PR1;
- chamber C2 and chamber C3 are at a pressure PR1;
- chamber C4 is at a pressure PR2.

The hydraulic fluid circulates now directly from chamber C1 towards chamber C2 and thus towards chamber C3, the piston of the left module is thus immobilized.

According to FIG. 13C, the piston of the right module 1B continues its course and reaches its limit stop. The check valve 12$d$ positioned at the entrance of chamber C4 is opened by the action of the rod or pin 13$d$ at the corresponding end of piston 3 of said module. In this situation, chamber C3 communicates with chamber C4 via a tubing 14$b$, linking the check valves (12$c$-12$d$) at the ends of body 2 of module 1$b$, the four chambers C1, C2, C3, C4 have the same pressure:
- chamber C1 is at a pressure PR1;
- chamber C2 and chamber C3 are also at a pressure PR1;
- chamber C4 is also at a pressure PR1.

The flow of hydraulic fluid circulates now freely through chambers C1 to C4, and the double rack pistons of each module are immobilized which results in different turning angles of modules 1$a$ and 1$b$.

Reference 15 designates check valves allowing the bleeding of the hydraulic circuit of the previously described hydraulic steering system.

We claim:

1. A hydraulic steering for a vehicle or a self-propelled machine having at least two rolling wheels and a chassis, the hydraulic steering system comprising:
   a hydraulic distributor;
   a steering wheel linked to said hydraulic distributor; and
   at least two hydraulic modules in which each of the hydraulic modules comprises:
      a module body having an assembly that includes a double piston translatably mounted in relation to a rack, said double piston being housed in a tight sliding relationship within a cylinder body, said cylinder defining two opposing chambers; and
      a gear meshed with said rack, said gear and said rack being connected such that any translating movement of said rack generates a rotary movement of variable amplitude of said module body or said gear upon introduction of a hydraulic fluid at a constant flow into one of the chambers, each of the hydraulic modules adapted to be linked by a pivoting element to one of the rolling wheels and adapted to be linked by a fixed organ to the chassis, said hydraulic distributor being connected to one of the chambers defined by said rack of the hydraulic module, another chamber of one of the modules communicating with another chamber of another of the modules, said rack having teeth of a variable linear profile.

2. The hydraulic steering system of claim 1, said rack having an intermediary element positioned between the pistons.

3. A hydraulic steering for a vehicle or a self-propelled machine having at least two rolling wheels and a chassis, the hydraulic steering system comprising:
   a hydraulic distributor;
   a steering wheel linked to said hydraulic distributor; and
   at least two hydraulic modules in which each of the hydraulic modules comprises:
      a module body having an assembly that includes a double piston translatably mounted in relation to a rack, said double piston being housed in a tight sliding relationship within a cylinder body, said cylinder defining two opposing chambers; and
      a gear meshed with said rack, said gear and said rack being connected such that any translating movement of said rack generates a rotary movement of variable amplitude of said module body or said gear upon introduction of a hydraulic fluid at a constant flow into one of the chambers, each of the hydraulic modules adapted to be linked by a pivoting element to one of the rolling wheels and adapted to be linked by a fixed organ to the chassis, said hydraulic distributor being connected to one of the chambers defined by said rack of the hydraulic module, another chamber of one of the modules communicating with another chamber of another of the modules, said gear being a circular gear mounted in an eccentric manner.

4. A hydraulic steering for a vehicle or a self-propelled machine having at least two rolling wheels and a chassis, the hydraulic steering system comprising:
   a hydraulic distributor;
   a steering wheel linked to said hydraulic distributor; and
   at least two hydraulic modules in which each of the hydraulic modules comprises:
      a module body having an assembly that includes a double piston translatably mounted in relation to a rack, said double piston being housed in a tight sliding relationship within a cylinder body, said cylinder defining two opposing chambers; and
      a gear meshed with said rack, said gear and said rack being connected such that any translating movement of said rack generates a rotary movement of variable amplitude of said module body or said gear upon introduction of a hydraulic fluid at a constant flow into one of the chambers, each of the hydraulic modules adapted to be linked by a pivoting element to one of the rolling wheel and adapted to be linked by a fixed organ to the chassis, said hydraulic distributor being connected to one of the chambers defined by said rack of the hydraulic module, another chamber of one of the modules communicating with another chamber of another of the modules, said gear being supported on an axis occupying a variable position relative to said teeth of said rack.

5. A hydraulic steering for a vehicle or a self-propelled machine having at least two rolling wheels and a chassis, the hydraulic steering system comprising:
a hydraulic distributor;
a steering wheel linked to said hydraulic distributor; and
at least two hydraulic modules in which each of the hydraulic modules comprises:
a module body having an assembly that includes a double piston translatably mounted in relation to a rack, said double piston being housed in a tight sliding relationship within a cylinder body, said cylinder defining two opposing chambers; and
a gear meshed with said rack, said gear and said rack being connected such that any translating movement of said rack generates a rotary movement of variable amplitude of said module body or said gear upon introduction of a hydraulic fluid at a constant flow into one of the chambers, each of the hydraulic modules adapted to be linked by a pivoting element to one of the rolling wheels and adapted to be linked by a fixed organ to the chassis, said hydraulic distributor being connected to one of the chambers defined by said rack of the hydraulic module, another chamber of one of the modules communicating with another chamber of another of the modules, said gear having an eccentric profile or a cam-shaped profile, said gear having a fixed position, said module body being pivotable.

6. A hydraulic steering for a vehicle or a self-propelled machine having at least two rolling wheels and a chassis, the hydraulic steering system comprising:
a hydraulic distributor;
a steering wheel linked to said hydraulic distributor; and
at least two hydraulic modules in which each of the hydraulic modules comprises:
a module body having an assembly that includes a double piston translatably mounted in relation to a rack, said double piston being housed in a tight sliding relationship within a cylinder body, said cylinder defining two opposing chambers; and
a gear meshed with said rack, said gear and said rack being connected such that any translating movement of said rack generates a rotary movement of variable amplitude of said module body or said gear upon introduction of a hydraulic fluid at a constant flow into one of the chambers, each of the hydraulic modules adapted to be linked by a pivoting element to one of the rolling wheels and adapted to be linked by a fixed organ to the chassis, said hydraulic distributor being connected to one of the chambers defined by said rack of the hydraulic module, another chamber of one of the modules communicating with another chamber of another of the modules, said gear having an eccentric profile or a cam-shaped profile, said module body having a fixed position, said gear being pivotable.

7. A hydraulic steering for a vehicle or a self-propelled machine having at least two rolling wheels and a chassis, the hydraulic steering system comprising:
a hydraulic distributor;
a steering wheel linked to said hydraulic distributor; and
at least two hydraulic modules in which each of the hydraulic modules comprises:
a module body having an assembly that includes a double piston translatably mounted in relation to a rack, said double piston being housed in a tight sliding relationship within a cylinder body, said cylinder defining two opposing chambers; and
a gear meshed with said rack, said gear and said rack being connected such that any translating movement of said rack generates a rotary movement of variable amplitude of said module body or said gear upon introduction of a hydraulic fluid at a constant flow into one of the chambers, each of the hydraulic modules adapted to be linked by a pivoting element to one of the rolling wheels and adapted to be linked by a fixed organ to the chassis, said hydraulic distributor being connected to one of the chambers defined by said rack of the hydraulic module, another chamber of one of the modules communicating with another chamber of another of the modules, said module body being pivotable and adapted to be linked to one of the rolling wheels, said gear having an eccentric profile or a cam-shaped profile, said module adapted to be fixedly attached to the chassis.

8. A hydraulic steering for a vehicle or a self-propelled machine having at least two rolling wheels and a chassis, the hydraulic steering system comprising:
a hydraulic distributor;
a steering wheel linked to said hydraulic distributor; and
at least two hydraulic modules in which each of the hydraulic modules comprises:
a module body having an assembly that includes a double piston translatably mounted in relation to a rack, said double piston being housed in a tight sliding relationship within a cylinder body, said cylinder defining two opposing chambers; and
a gear meshed with said rack, said gear and said rack being connected such that any translating movement of said rack generates a rotary movement of variable amplitude of said module body or said gear upon introduction of a hydraulic fluid at a constant flow into one of the chambers, each of the hydraulic modules adapted to be linked by a pivoting element to one of the rolling wheels and adapted to be linked by a fixed organ to the chassis, said hydraulic distributor being connected to one of the chambers defined by said rack of the hydraulic module, another chamber of one of the modules communicating with another chamber of another of the modules, said module body adapted to be fixedly and rigidly attached to the chassis, said gear having an eccentric profile or a cam-shaped profile, said module adapted to be fixedly linked to one of the rolling wheels.

* * * * *